United States Patent
Mischler et al.

(10) Patent No.: US 9,194,319 B2
(45) Date of Patent: Nov. 24, 2015

(54) METHODS FOR INTENTIONAL TURBO SURGING FOR ENHANCED SYSTEM CONTROL AND PROTECTIONS

(71) Applicant: General Electric Company, Schenectady, NY (US)

(72) Inventors: James Robert Mischler, Lawrence Park, PA (US); Luke Henry, Lawrence Park, PA (US); Greg Thomas Polkus, Waukesha, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 281 days.

(21) Appl. No.: 13/749,881

(22) Filed: Jan. 25, 2013

(65) Prior Publication Data
US 2014/0214304 A1 Jul. 31, 2014

(51) Int. Cl.
| | |
|---|---|
| F02B 33/44 | (2006.01) |
| F02B 27/04 | (2006.01) |
| F02D 41/18 | (2006.01) |
| F02D 41/22 | (2006.01) |
| F02D 41/24 | (2006.01) |
| F02M 25/07 | (2006.01) |
| F02D 41/00 | (2006.01) |
| F02B 37/12 | (2006.01) |
| F02B 37/16 | (2006.01) |
| F02B 37/18 | (2006.01) |
| F02B 29/04 | (2006.01) |

(52) U.S. Cl.
CPC ............ *F02D 41/18* (2013.01); *F02D 41/0007* (2013.01); *F02D 41/22* (2013.01); *F02D 41/2441* (2013.01); *F02M 25/0702* (2013.01); *F02M 25/0707* (2013.01); *F02M 25/0749* (2013.01); *F02B 29/0406* (2013.01); *F02B 37/16* (2013.01); *F02B 37/18* (2013.01); *F02B 2037/125* (2013.01); *F02D 41/2464* (2013.01); *F02D 2200/0406* (2013.01); *F02D 2200/101* (2013.01); *F02M 25/0726* (2013.01); *Y02T 10/144* (2013.01); *Y02T 10/40* (2013.01)

(58) Field of Classification Search
CPC ... F02D 41/0007; F02D 41/22; F02D 41/222; F02D 43/04; F02D 43/02; F02B 37/00; F02B 37/22; F02B 2037/125
USPC ........... 123/559.2, 564; 415/27, 1; 73/118.01, 73/118.02, 118.1, 112.05, 114.77; 60/315, 60/598, 599, 611, 600, 602, 605.2, 605.1, 60/608, 624, 273; 701/100, 101, 102, 108, 701/29.2, 29.4, 29.9, 31.8, 31.9, 32.8, 33.4
See application file for complete search history.

(56) References Cited

U.S. PATENT DOCUMENTS

| | | | | |
|---|---|---|---|---|
| 4,861,233 | A * | 8/1989 | Dziubakowski et al. | 417/201 |
| 5,195,875 | A * | 3/1993 | Gaston | 417/282 |
| 5,765,991 | A * | 6/1998 | Blotenberg | 415/26 |
| 6,079,211 | A * | 6/2000 | Woollenweber et al. | 60/612 |
| 6,298,718 | B1 * | 10/2001 | Wang | 73/114.01 |
| 7,089,738 | B1 * | 8/2006 | Boewe et al. | 60/605.2 |
| 7,757,549 | B2 * | 7/2010 | Andreae et al. | 73/114.77 |
| 7,762,068 | B2 * | 7/2010 | Tabata et al. | 60/608 |

(Continued)

*Primary Examiner* — Stephen K Cronin
*Assistant Examiner* — George Jin
(74) *Attorney, Agent, or Firm* — GE Global Patent Operation; John A. Kramer

(57) ABSTRACT

Various methods and systems are provided for determining a surge level of a compressor. In one embodiment, a method for an engine comprises updating a stored estimate of a surge level of a compressor responsive to detection of a surge event.

19 Claims, 6 Drawing Sheets

(56) References Cited

U.S. PATENT DOCUMENTS

| | | | |
|---|---|---|---|
| 8,001,778 B2* | 8/2011 | Sun | 60/605.2 |
| 2004/0216457 A1* | 11/2004 | Shea et al. | 60/608 |
| 2004/0244375 A1* | 12/2004 | Kono et al. | 60/605.2 |
| 2007/0062191 A1* | 3/2007 | Furman et al. | 60/607 |
| 2007/0095063 A1* | 5/2007 | Mischler et al. | 60/608 |
| 2008/0034753 A1* | 2/2008 | Furman et al. | 60/605.1 |
| 2008/0232952 A1* | 9/2008 | Gu et al. | 415/11 |
| 2010/0296914 A1* | 11/2010 | Staroselsky et al. | 415/47 |
| 2011/0209690 A1* | 9/2011 | Ulrey et al. | 123/564 |
| 2014/0041384 A1* | 2/2014 | Mischler et al. | 60/605.2 |
| 2014/0214304 A1* | 7/2014 | Mischler et al. | 701/102 |

* cited by examiner

METHODS FOR INTENTIONAL TURBO SURGING FOR ENHANCED SYSTEM CONTROL AND PROTECTIONS

FIELD

Embodiments of the subject matter disclosed herein relate to an engine, engine components, and an engine system, for example.

BACKGROUND

Turbocharging an engine allows the engine to provide power similar to that of a larger displacement engine. Thus, turbocharging can extend the operating region of an engine. Turbochargers function by compressing intake air in a compressor via a turbine operated by exhaust gas flow. Under certain conditions, the flow rate and pressure ratio across the turbocharger can fluctuate to levels such that air flow may stop going through the compressor and reverse direction. In some cases, this may cause turbocharger performance issues and compressor or turbine degradation. Such events that create flow instability may be referred to as surge events. As such, a compressor surge level may be defined as a limitation of the mass air flow at the inlet of the compressor. Such turbocharger performance issues may be mitigated by adjusting the flow rate through the turbocharger, such as by adjusting one or more turbocharger bypass valves in order to avoid a surge event. However, such adjustments may be based on stored model-based data that does not provide adequate avoidance of the flow rate/pressure ratio fluctuations.

BRIEF DESCRIPTION

In one embodiment, a method (e.g., method for controlling an engine) comprises updating a stored estimate of a surge level of a compressor in an engine system of a vehicle responsive to detection of a surge event.

In this way, turbocharger operation may be optimized by updating a stored surge level with a measured surge level. More accurate measured surge data may then be used to reduce the occurrence of future surge events.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for determining a surge level of a compressor. Pre-determined surge level data may be used by a controller in an engine system to adjust engine operating conditions as compressor operation approaches a surge level. In this way, compressor surge events may be reduced. However, modeled surge data used for surge control may be inaccurate and not reflect changes to turbocharger operation over time. Thus, surge events may occur outside predicted surge levels before engine operating conditions may be adjusted. By measuring a surge level during a surge event and updating the stored surge level with the measured surge level, more accurate surge data may be obtained. This measured surge data may then be used to reduce the occurrence of future surge events.

In one example, a surge event may be induced by adjusting engine operating conditions. Surge events may be induced at a set frequency during vehicle operation. In this way, changes in turbocharger operation due to engine or vehicle degradation may be determined based on changes in the measured surge level. Methods for inducing surge and measuring the surge level during a surge event are presented below at FIGS. 3-6.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and rail vehicles. For clarity of illustration, a locomotive is provided as an example of a mobile platform supporting a system incorporating an embodiment of the invention.

Figure 1:
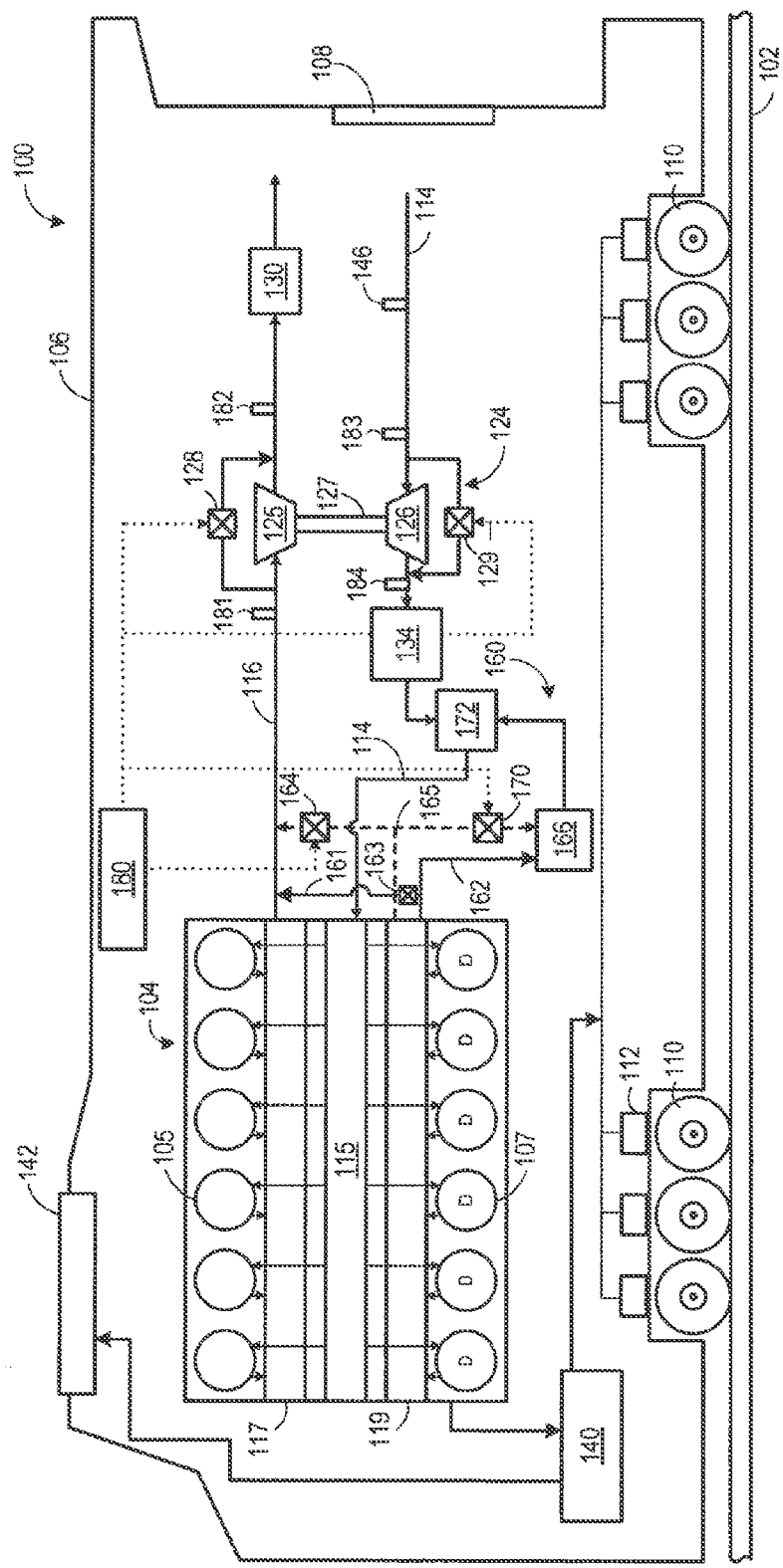
FIG. 1 shows a schematic diagram of a rail vehicle with an engine according to an embodiment of the invention.

Before further discussion of the approach for updating a stored surge level of a compressor, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle 106 includes an engine 104. In other non-limiting embodiments, the engine 104 may be a stationary engine, such as in a power-plant application, or an engine in a marine vessel or off-highway vehicle propulsion system as noted above.

The engine 104 receives intake air for combustion from an intake, such as an intake manifold 115. The intake may be any suitable conduit or conduits through which gases flow to enter the engine. For example, the intake may include the intake manifold 115, the intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 140 and electric traction motors 112. For example, the engine 104 is a diesel engine that generates a torque output that is transmitted to the alternator/generator 140 which is mechanically coupled to the engine 104. The alternator/generator 140 produces electrical power that may be stored and applied for subsequent propagation to a variety of downstream electrical components. As an example, the alternator/generator 140 may be electrically coupled to a plurality of traction motors 112 and the alternator/generator 140 may provide electrical power to the plurality of traction motors 112. As depicted, the plurality of traction motors 112 are each connected to one of a plurality of wheels 110 to provide tractive power to propel the rail vehicle 106. One example configuration includes one traction motor per wheel. As depicted herein, six pairs of traction motors correspond to each of six pairs of wheels of the rail vehicle. In another example, alternator/generator 140 may be coupled to one or more resistive grids 142. The resistive grids 142 may be configured to dissipate excess engine torque via heat produced by the grids from electricity generated by alternator/generator 140.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders 105 are coupled to the exhaust passage 116 to route exhaust gas from the engine to atmosphere (after it passes through an exhaust gas treatment system 130 and a turbocharger 124). The donor cylinders 107, which provide engine exhaust gas recirculation (EGR), are coupled exclusively to an EGR passage 162 of an EGR system 160 which routes exhaust gas from the donor cylinders 107 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$).

Exhaust gas flowing from the donor cylinders 107 to the intake passage 114 passes through a heat exchanger such as an EGR cooler 166 to reduce a temperature of (e.g., cool) the exhaust gas before the exhaust gas returns to the intake passage. The EGR cooler 166 may be an air-to-liquid heat exchanger, for example. In such an example, a charge air cooler 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Additionally, in some embodiments, the EGR system 160 may include an EGR bypass passage 161 that is configured to divert exhaust from the donor cylinders back to the exhaust passage. The EGR bypass passage 161 may be controlled via a valve 163. The valve 163 may be configured with a plurality of restriction points such that a variable amount of exhaust is routed to the exhaust, in order to provide a variable amount of EGR to the intake.

In an alternate embodiment shown in FIG. 1, the donor cylinders 107 may be coupled to an alternate EGR passage 165 (illustrated by the dashed lines) that is configured to selectively route exhaust to the intake or to the exhaust passage. For example, when a second EGR valve 170 is open, exhaust may be routed from the donor cylinders to the EGR cooler 166 and/or additional elements prior to being routed to the intake passage 114. Further, the alternate EGR system includes a first EGR valve 164 disposed between the exhaust passage 116 and the alternate EGR passage 165.

The first EGR valve 164 and second EGR valve 170 may be on/off valves controlled by the control unit 180 (for turning the flow of EGR on or off), or they may control a variable amount of EGR, for example. As such, the valves may be adjusted into a plurality of positions between fully open and fully closed. In some examples, the first EGR valve 164 may be actuated such that an EGR amount is reduced (exhaust gas flows from the EGR passage 165 to the exhaust passage 116). For example, the opening of the first EGR valve 164 may be increased, thereby increasing the flow of exhaust from the donor cylinders to the exhaust passage 116. In other examples, the first EGR valve 164 may be actuated such that the EGR amount is increased (e.g., exhaust gas flows from the exhaust passage 116 to the EGR passage 165). For example, the opening of the first EGR valve 164 may be decreased, thereby reducing flow to the exhaust passage 116. In yet another example, the second EGR valve 170 may be actuated to reduce the amount of EGR. For example, closing the second EGR valve 170 may reduce the flow of exhaust from the donor cylinders to the intake passage 114. In some embodiments, the alternate EGR system may include a plurality of EGR valves or other flow control elements to control the amount of EGR.

In such a configuration, the first EGR valve 164 is operable to route exhaust from the donor cylinders to the exhaust passage 116 of the engine 104 and the second EGR valve 170 is operable to route exhaust from the donor cylinders to the intake passage 114 of the engine 104. As such, the first EGR valve 164 may be referred to as an EGR bypass valve, while the second EGR valve 170 may be referred to as an EGR metering valve. In the embodiment shown in FIG. 1, the first EGR valve 164 and the second EGR valve 170 may be engine oil, or hydraulically, actuated valves, for example, with a shuttle valve (not shown) to modulate the engine oil. In some examples, the valves may be actuated such that one of the first and second EGR valves 164 and 170 is normally open and the other is normally closed. In other examples, the first and second EGR valves 164 and 170 may be pneumatic valves, electric valves, or another suitable valve.

In some example, one or more of the EGR valves in the EGR system 160 may become degraded. For example, a command to actuate one or more of the EGR valves may not result in the actuation of the valve. As such, an EGR valve may be stuck in one position and immovable upon actuation of the valve. In one example, a degraded or stuck valve may be diagnosed by a position sensor located on the valve. As such, a control unit 180 may determine the valve is degraded when a valve position does not change upon actuation of the valve. In another example, a degraded or stuck valve may be diagnosed by an expected change in an engine operating condition upon actuation of the valve. For example, if second EGR valve 170 is commanded closed and EGR flow does not decrease following the commanded actuation, the second EGR valve 170 may be degraded or stuck in an open position. Methods for freeing a stuck valve are described further below with reference to FIG. 4 and FIG. 6.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure FOR system which routes exhaust gas from a location upstream of turbocharger 124 in the exhaust passage 116 to a location downstream of turbocharger 124 in the intake passage 114. In other embodiments, the vehicle system 100 may additionally or alternatively include a low-pressure EGR system which routes exhaust gas from downstream of the turbocharger 124 in the exhaust passage 116 to a location upstream of the turbocharger 124 in the intake passage 114.

As depicted in FIG. 1, the vehicle system 100 further includes a turbocharger 124 positioned between the intake passage 114 and the exhaust passage 116. The turbocharger 124 increases air charge of ambient air drawn into the intake passage 114 in order to provide greater charge density during combustion to increase power output and/or engine-operating efficiency. The turbocharger 124 includes a turbine 125 which drives a compressor 126. The turbine 125 and compressor 126 are mechanically coupled via a shaft 127. In some embodiments, the vehicle system 100 may include a two-stage turbocharger, with the two turbochargers arranged in series. A first turbocharger may operate at a relatively lower pressure (e.g., low-pressure turbocharger) while a second turbocharger may operate at a relatively higher pressure (e.g. high-pressure turbocharger). In some examples, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, or the like. In one example, three turbochargers are used in series. In another example, only two turbochargers are used in series.

As explained above, the terms "high pressure" and "low pressure" are relative, meaning that "high" pressure is a pressure higher than a "low" pressure. Conversely, a "low" pressure is a pressure lower than a "high" pressure.

In the embodiment shown in FIG. 1, the turbocharger 124 is provided with a turbine bypass valve 128 which allows exhaust gas to bypass the turbocharger 124. The turbine bypass valve 128 may be opened, for example, to divert the exhaust gas flow away from the turbine 125. In this manner, the rotating speed of the compressor 126, and thus the boost provided by the turbocharger 124 to the engine 104 may be regulated during steady state conditions. Additionally, in this embodiment, the turbocharger 124 is provided with a compressor bypass valve 129, which allows gas to recirculate around the compressor 126 to avoid compressor surge, for example. In some embodiments, turbocharger 124 may not have a compressor bypass valve 129.

Operation of turbocharger 124 may be maintained within surge and choke limits of the turbocharger, thereby increasing turbocharger efficiency. Performance of the compressor 126 of the turbocharger 124 may be defined by a map defining the relationship between a compressor pressure ratio (e.g., difference in pressure between the compressor inlet and compressor outlet) and a mass air flow rate (e.g., mass air flow). Mass air flow and engine speed values used in a compressor map are corrected values based on a compressor inlet pressure and compressor inlet temperature. By using corrected mass air flow values and corrected engine speed values, the compressor map may be valid at any compressor inlet temperature and pressure. Thus, when referring to mass air flow and engine speed below with regard to a compressor map, these parameters are actually corrected mass air flow and corrected engine speed values.

Figure 2:
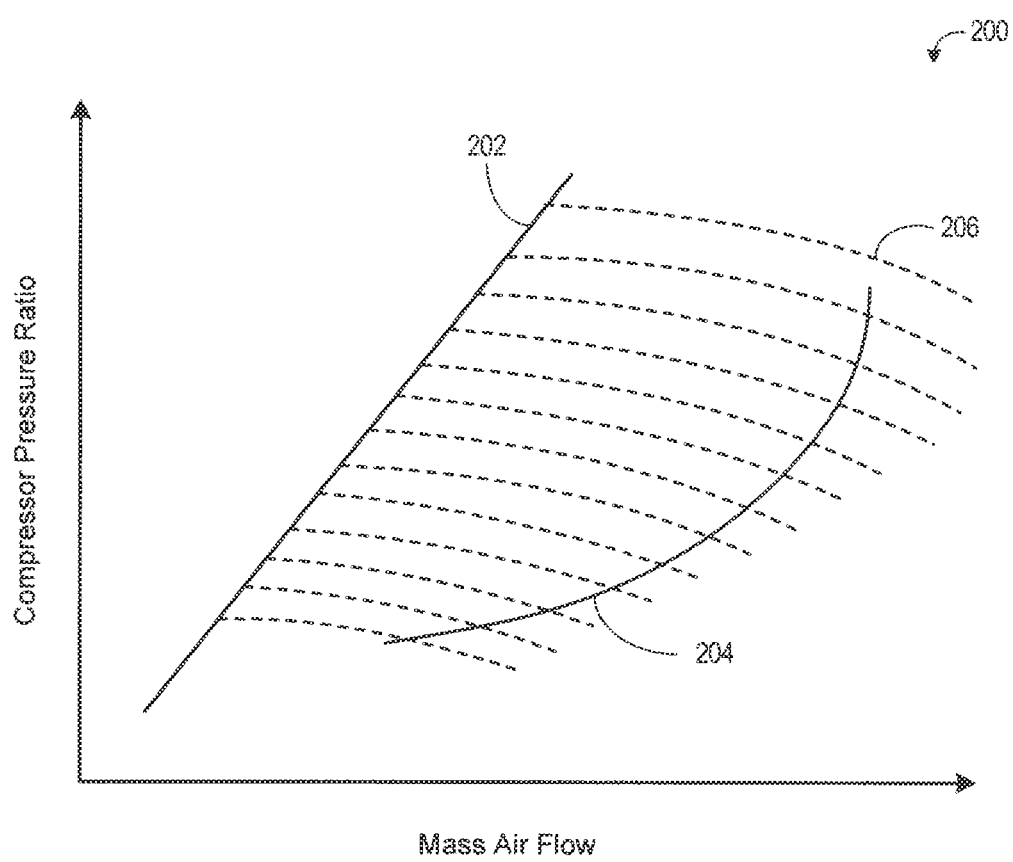
FIG. 2 shows a schematic diagram of a compressor map for a turbocharger according to an embodiment of the invention.

An example of a compressor performance map 200 is shown in FIG. 2. The compressor pressure ratio is shown on the y-axis and the mass air flow rate is shown on the x-axis. The dashed lines on the map are turbine speed lines 206 which represent different speeds of the turbine 125. The compressor performance is limited by a surge line 202 and a choke line 204. At each turbine speed, there is a surge limit or level and a choke limit or level which corresponds to a compressor pressure ratio and mass air flow. Compressor performance may be maintained between the surge line 202 and choke line 204 to increase turbocharger efficiency and reduce turbocharger degradation. The surge level may be defined as the limitation of the mass air flow at the inlet of the compressor 126. If the compressor pressure ratio is too high and the mass air flow is too small, the air flow may stop going through the compressor and reverse direction until the pressure is stabilized and the positive mass air flow is reached again. This flow instability may create a pulsation and result in a noise termed as "surging". A choke level may be a maximum mass air flow rate through the compressor at each operating condition. The choke level may be based on the cross section of the compressor inlet.

The compressor performance map 200 may be pre-defined and generated by bench top turbocharger testing. As such, a compressor performance map, such as the map shown in FIG. 2, for the turbocharger 124 may be stored within a control unit 180 of the vehicle system 100. The compressor map may provide a stored, model-based surge level for each operating condition of the turbocharger 124. According to embodiments disclosed herein, the control unit 180 may reduce surge events by controlling turbocharger 124 operation based on the compressor performance map. For example, the control unit 180 may adjust an engine operating condition in response to turbocharger operation approaching the surge line on the compressor performance map. Engine operating adjustments may include adjusting the turbine bypass valve 128, compressor bypass valve 129, EGR valves 163, 164, and 165, engine cooling, engine speed, or the like.

One pre-defined compressor performance map may be used in a plurality of vehicles for a plurality of turbocharger units. In some cases, operation of turbocharger 124 may vary from the modeled compressor map. Additionally, turbocharger operation may vary between turbochargers of different vehicles. Further, operation of turbocharger 124 may change over time while the modeled compressor map remains unchanged. Methods to customize the surge line and compressor map for turbocharger 124 may reduce compressor surge events, aid in diagnostic knowledge of the system, or improve engine performance in general. Further details on methods for measuring a surge level and updating modeled surge data is presented below with reference to FIGS. 3-6.

Returning to FIG. 1, the vehicle system 100 further includes an exhaust treatment system 130 coupled in the exhaust passage in order to reduce regulated emissions. As depicted in FIG. 1, the exhaust gas treatment system 130 is disposed downstream of the turbine 125. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

In the embodiment shown in FIG. 1, a ventilation door 108 is provided on or inside the rail vehicle 106. The ventilation door 108 may be manually operable by a vehicle operator. As such, the ventilation door 108 may be moved into a closed position when an ambient temperature is relatively warmer, such as during vehicle operation in the summer. Alternatively, the ventilation door 108 may be moved into an open position when an ambient temperature is relatively cooler, such as during vehicle operation in the winter. When the ventilation door 108 is in the closed position, relatively cooler intake air comes from outside the vehicle only. When the ventilation door 108 is in the open position, intake air comes from outside the vehicle as well as through the engine compartment. Thus, when the ventilation door 108 is in the open position relatively warmer intake air enters the engine. As a result, there may be a pressure difference between when the ventilation door 108 is open and when the ventilation door is closed. Depending on the position of the ventilation door 108, the compressor inlet temperature and pressure map change. Since the compressor map corrects from compressor inlet temperature and pressure, the ventilation door position should not affect the compressor map and surge line. However, if the compressor inlet pressure is not directly sensed at the compressor inlet, this may cause the turbocharger operation point in the compressor map to shift slightly. Thus, the combination of inaccuracies in estimating compressor inlet pressure and a change in the ventilation door 108 position may cause a shift in the surge line on the compressor map.

The vehicle system 100 further includes the control unit 180, which is provided and configured to control various components related to the vehicle system 100. Herein, the control unit 180 may be referred to as the controller. In one example, the control unit 180 includes a computer control system. The control unit 180 further includes non-transitory, computer readable storage media (not shown) including code for enabling on-board monitoring and control of engine operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control unit 180 may receive signals from various engine sensors including sensor 181 arranged in the inlet of the turbine 125, sensor 182 arranged in the exit of the turbine 125, sensor 183 arranged in the inlet of the compressor 126, and sensor 184 arranged in the outlet of the compressor 126. The sensors arranged in the inlets and outlets of the turbine and compressor may detect air temperature and/or pressure. Additional sensors may include, but are not limited to, engine speed, engine load, boost pressure, ambient pressure and temperature, exhaust temperature, exhaust pressure, turbine speed, mass air flow, EGR flow, MAP, or the like. Correspondingly, the control unit 180 may control the vehicle system 100 by sending commands to various components such as traction motors, alternator, cylinder valves, throttle, heat exchangers, wastegates or other valves or flow control elements, or the like.

As another example, the controller may receive signals from one or more intake gas constituent (e.g., O2, $NO_x$, $CO_2$, and the like) sensors 146 disposed in the intake passage 114 indicating intake gas constituent concentrations. The sensors 146 may be positioned at various positions in the intake passage 114, including upstream of the turbocharger 120 and/or downstream of the turbocharger's compressor, as well as upstream of the introduction of EGR and/or downstream of the introduction of EGR into the intake system. Additionally, the sensors 146 may be coupled to the intake of all cylinders of the engine, or a subset of engine cylinders, or a single cylinder of the engine. In one example, an intake oxygen fraction or percentage may be obtained from sensors 146. The intake oxygen fraction may then be used by the controller to adjust the valves in the EGR system to deliver a specific EGR flow rate or amount of EGR.

The system of FIG. 1 may provide for an engine system including a turbocharger which includes a compressor, an exhaust gas recirculation system with one or more exhaust gas recirculation valves controlling a flow of exhaust gas through the exhaust gas recirculation system, and a control unit. In one example, the control unit is configured to update a stored estimate of a surge level of the compressor responsive to detection of a surge event.

Updating a stored estimate of a surge level may include determining a measured surge level of the compressor. As described above, pre-determined modeled surge levels may be stored within the controller as values or as a surge line of a compressor performance map. These stored surge levels may then be used to predict when a surge event may occur and implement a surge avoidance strategy. The surge avoidance strategy may include adjusting engine operating parameters to reduce the likelihood of a surge event, as discussed further below. In some examples, modeled surge levels may not accurately reflect turbocharger operation. In other examples, turbocharger operation may change over time or in response to external events (e.g., ambient conditions). Thus, by measuring a surge level during compressor surge events and updating (e.g., via a filter) the pre-stored modeled surge level with the measured surge level, a surge line may be customized for the turbocharger. Compressor surge events may be tracked over time and the measured surge levels may be further updated as turbocharger operating conditions change. In this way, more finely tuned measured surge levels may be used by the controller to reduce future surge events and maximize engine performance.

In one example, compressor surge events may accidentally occur. For example, a surge event may occur outside of the predicted surge level, as determined by the stored compressor map. This may happen when using a modeled surge level in a surge avoidance strategy. In this case, a surge event may be detected by the controller monitoring an intake manifold pressure (MAP). For example, a sudden decrease followed by a recovery in MAP may indicate a surge event. In another example, a surge event may be indicated by a sudden increase followed by a recovery in turbine speed.

In another example, compressor surge events may be controllably induced in order to update the stored surge level and improve the surge avoidance strategy. As such, inducing a surge event may be responsive to a surge diagnostic cycle. For example, a surge diagnostic cycle may be run after a duration of engine operation time has passed. The duration may be based on an amount of time in which operation of the turbocharger may degrade or change. In this way, a compressor surge event may be induced after a designated duration of service of the vehicle. Inducing a surge event and running a surge diagnostic may be done either online, while the vehicle is in service, or offline, when the vehicle is not in service. For example, a surge diagnostic may be run offline during a vehicle maintenance test (e.g., six month maintenance test). During this testing, several turbocharger operating points may be chosen for inducing surge. For example, surge may be induced at several turbine speeds. In this way, several surge levels may be measured, thereby producing a modeled surge line on the compressor map.

Inducing a surge event may include adjusting an engine operating parameter in order to move turbocharger operation toward the surge line. For example, the controller may induce the compressor surge event by decreasing engine speed while maintaining a tractive power or effort of the vehicle (e.g., maintaining a constant engine load). In another example, the controller may induce the compressor surge event by decreasing engine cooling of the intake manifold. Decreasing engine cooling may include reducing the cooling provided by the charge air cooler. By decreasing the cooling effort of the engine, an intake manifold temperature increases. As the difference between the intake manifold temperature and the intake air temperature (e.g., temperature of the air entering the compressor) increases, compressor operation moves toward the surge line.

In yet another example, compressor surge events may opportunistically occur. For example, an ambient condition may cause turbocharger operation to move toward the surge line on the compressor map. In one example, as ambient temperature decreases, the intake air temperature decreases while the intake manifold temperature is maintained for engine operation. As a result, the difference between the intake manifold temperature and the intake air temperature increases, thereby moving turbocharger operation toward the surge line. In this situation, the controller may normally increase engine speed as ambient temperature decreases in order to reduce the likelihood of a surge event. However, if a surge diagnostic is needed, the controller may instead maintain engine speed and allow a surge event to occur. In another example, when the vehicle exits a tunnel, the intake air temperature may decrease significantly, again increasing the difference between the intake manifold temperature and the intake air temperature. In this case, instead of adjusting engine operating conditions in response to compressor operation approaching (moving towards) the surge level, the controller may maintain engine operating conditions and enable operation with the compressor surge.

In addition to updating the surge level, inducing a surge event may be in response to degradation of an EGR valve. As discussed above, one or more EGR valves may become degraded. For example, an EGR valve may be stuck in one position and immovable upon actuation of the valve. During a surge event, there is a rapid change in pressure on both the intake and exhaust side of the engine as air flow through the turbocharger reverses and the turbocharger re-ingests air. This may produce a pressure shock on both sides of the EGR valve, thereby aiding in freeing the EGR valve from its stuck position. When an EGR valve is degraded or stuck, surge may be induced by decreasing engine cooling. Since the EGR valves may be driven by oil which is a function of engine speed, engine speed may remain relatively high to keep pressure on the valves. Thus, when an EGR valve is degraded, surge may not be induced by decreasing engine speed.

In one embodiment, a method comprises inducing a compressor surge event by decreasing engine cooling while maintaining engine speed in response to determining degradation of an EGR valve in an engine system. Another, related method relates to controlling an engine system. The engine system comprises an EGR system having an EGR valve. The engine system further comprises a turbocharger. The turbocharger comprises a turbine and a compressor, and is operably coupled to an engine air intake and exhaust outlet for the turbine to be driven by engine exhaust and to in turn move the compressor for compressing intake air. The method comprises determining that the EGR valve is degraded (e.g., that the valve meets one or more designated criteria for not operating in a designated matter for carrying out its function within the engine system). For example, the EGR valve may be stuck in one position and immovable upon actuation of the valve. The method further comprises, if the EGR valve is determined as degraded, inducing a compressor surge event by decreasing engine cooling while maintaining engine speed. The purposeful inducement of the compressor surge event may result in the EGR valve no longer being degraded. For example, if the degradation was the valve being stuck, the valve may become unstuck.

During a compressor surge event, a measured estimate of a surge level may be determined by measuring a pressure difference across the compressor (e.g., compressor pressure ratio), turbine speed, and a mass air flow rate. The measured surge level may then update the stored or previously measured surge level. In some cases, this may include updating the surge line in the compressor performance map with one or more filters to reduce introduction of noise. In some embodiments, the stored surge level may only be updated when a difference between the measured surge level and the modeled surge level is greater than a threshold difference. The measured surge level may then become the new stored surge level. This new surge level may then be used by the controller to reduce future surge events. For example, the controller may adjust engine operating parameters based on the determined or newly stored surge level. In one example, when the difference between the intake manifold temperature and the intake air temperature increases such that turbocharger operation is within a threshold of the updated surge level, the controller may increase engine speed. In this way, the engine system of the vehicle may be controlled, for at least propulsion, based on the stored estimate of the surge level that is updated.

When the difference between the measured surge level and the modeled or previously stored surge level is greater than a threshold difference, a controller may indicate an external event. In one example, the threshold difference may be a first threshold difference, the first threshold difference the same as the threshold difference for updating the surge level. In another example, the threshold difference may be a second threshold difference, greater than the first threshold difference. In either case, the threshold difference may be based on a difference in turbocharger operation produced by an external event and not normal engine operation. As such, indicating an external event may include indicating degradation of the engine and/or vehicle. For example, if an engine component is degraded, turbocharger operation may change, thereby altering the surge line of the compressor. In another example, if an engine component such as the ventilation door is in an incorrect position, a difference in turbocharger operation and surge level may be seen. Thus, a controller may indicate degradation of the engine system when the difference between the determined surge level and the stored surge level is greater than a threshold difference.

In this way, a stored estimate of a surge level of a compressor in an engine system of a vehicle may be updated responsive to detection of a surge event. The updating the stored estimate of the surge level may include determining a measured surge level by measuring or estimating two or more of a pressure difference across the compressor, an engine speed, a turbine speed, and an mass air flow rate during the surge event. A modeled surge level may then be updated based on the measured surge level if a difference between the measured surge level and the modeled surge level is greater than a threshold difference. Further, surge may be induced by adjusting a first operating parameter during a first condition, and adjusting a second operating parameter during a second condition. The adjusting the first operating parameter during the first condition may include decreasing engine speed responsive to a determination that an exhaust gas recirculation valve is not degraded, and adjusting the second operating parameter during the second condition may include decreasing engine cooling responsive to determination that the exhaust gas recirculation valve is degraded.

Figure 3:
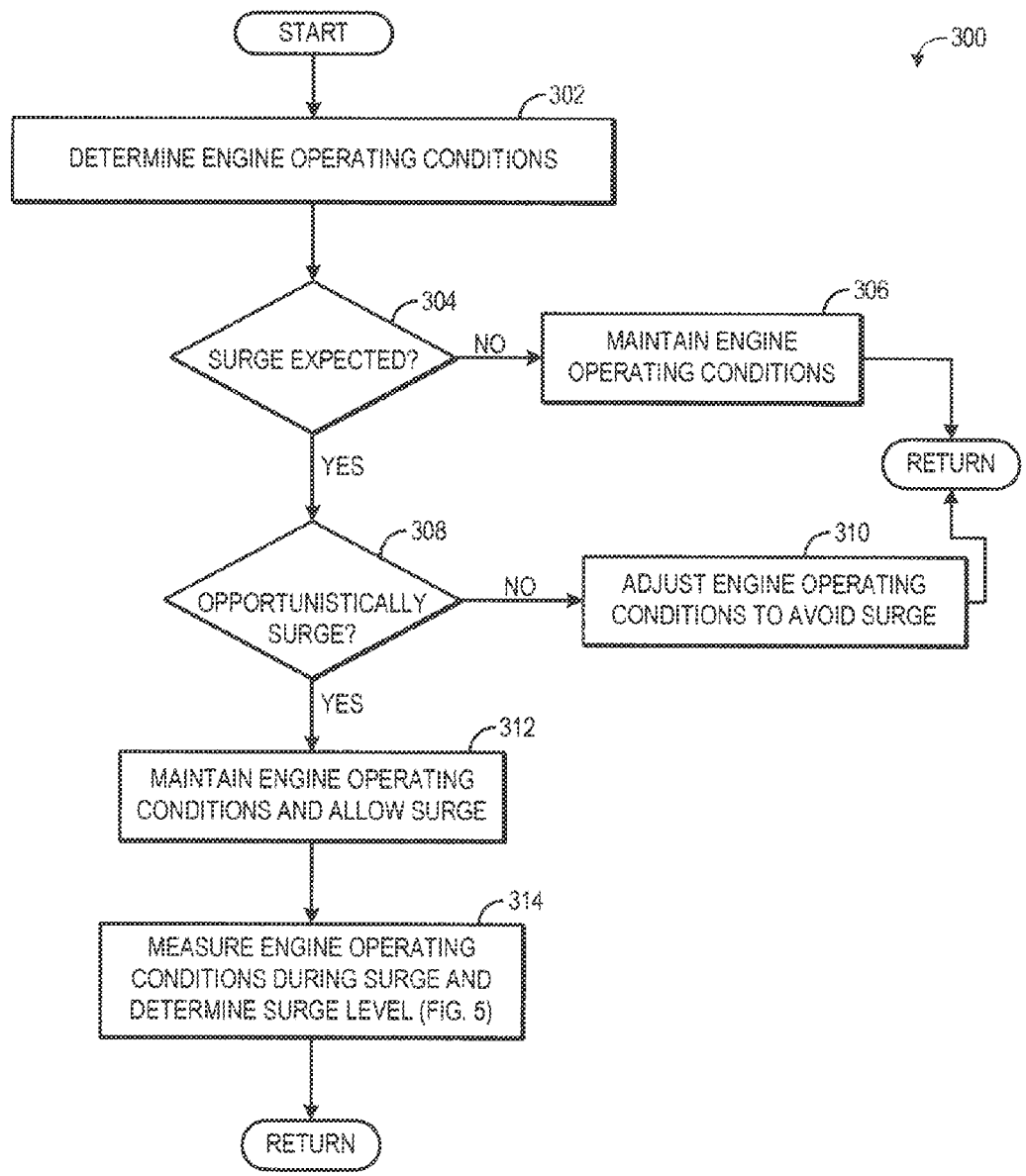
FIG. 3 shows a flow chart illustrating a method for adjusting engine operating conditions in response to a surge event according to an embodiment of the invention.

Engine operating conditions may be adjusted to avoid compressor surge, based on a stored surge level. Alternatively, if a surge measurement or diagnostic is needed, engine operating conditions may be maintained to enable surge if a surge event is predicted. FIG. 3 shows a method 300 for adjusting engine operating conditions in response to an expected, or predicted, surge event. The method begins at 302 by determining engine operating conditions. Engine operating conditions may include engine speed and load, compressor pressure ratio, turbine speed, mass air flow, ambient temperature, intake manifold temperature, MAP, and the like.

At 304, the method includes determining if a surge event is expected. In one example, this may include determining if an ambient temperature is below a threshold temperature. In another example, this may include determining if the difference between the intake manifold temperature and the intake air temperature is greater than a threshold difference. In yet another example, this may include determining if the vehicle is exiting a tunnel. If a surge event is not expected at 304, the method continues on to 306 to maintain engine operating conditions. However, if a compressor surge is expected, the method continues on to 308 to determine if the controller may allow an opportunistic surge. For example, if a surge diagnostic is needed to measure and update the surge level, the method may allow the compressor to surge. In some examples, allowing the compressor to surge may not be safe and may result in engine degradation. For example, if turbine speed is above a threshold speed and/or MAP is above a threshold value, surge may not be allowed. If the method decides that it is not time for a surge diagnostic or it is not safe to surge, the controller adjusts engine operating conditions at 310 to avoid surge. The adjusting engine operating conditions to avoid surge may be based on the current stored surge level. In on example, the method at 310 may include opening the compressor bypass valve. In another example, the method at 310 may include opening the turbine bypass valve. In yet another example, the method at 310 may include increasing engine speed. In another example, the method at 310 may include adjusting the EGR valves to increase or decrease EGR flow. These listed engine operating parameter adjustments may be based on the stored surge level which may have been previously determined during a surge event. As such, control of an engine system of a vehicle may be based on a stored estimate of the surge level (which may be updated during surge events, described further below with regard to FIG. 5). For example, engine speed and various valves may be adjusted in accordance with the stored surge level in order to either avoid or allow a surge event.

Alternatively, if a surge diagnostic is desired at 308, the method continues on to 312 to maintain engine operating conditions and enable operation with the compressor surge. At 314, the controller measures engine operating conditions during the surge and then uses this information to determine the measured surge level. This may include measuring the compressor pressure ratio, mass air flow, and turbine speed during the surge event. Further details on the method at 314 are presented at FIG. 5.

Figure 4:
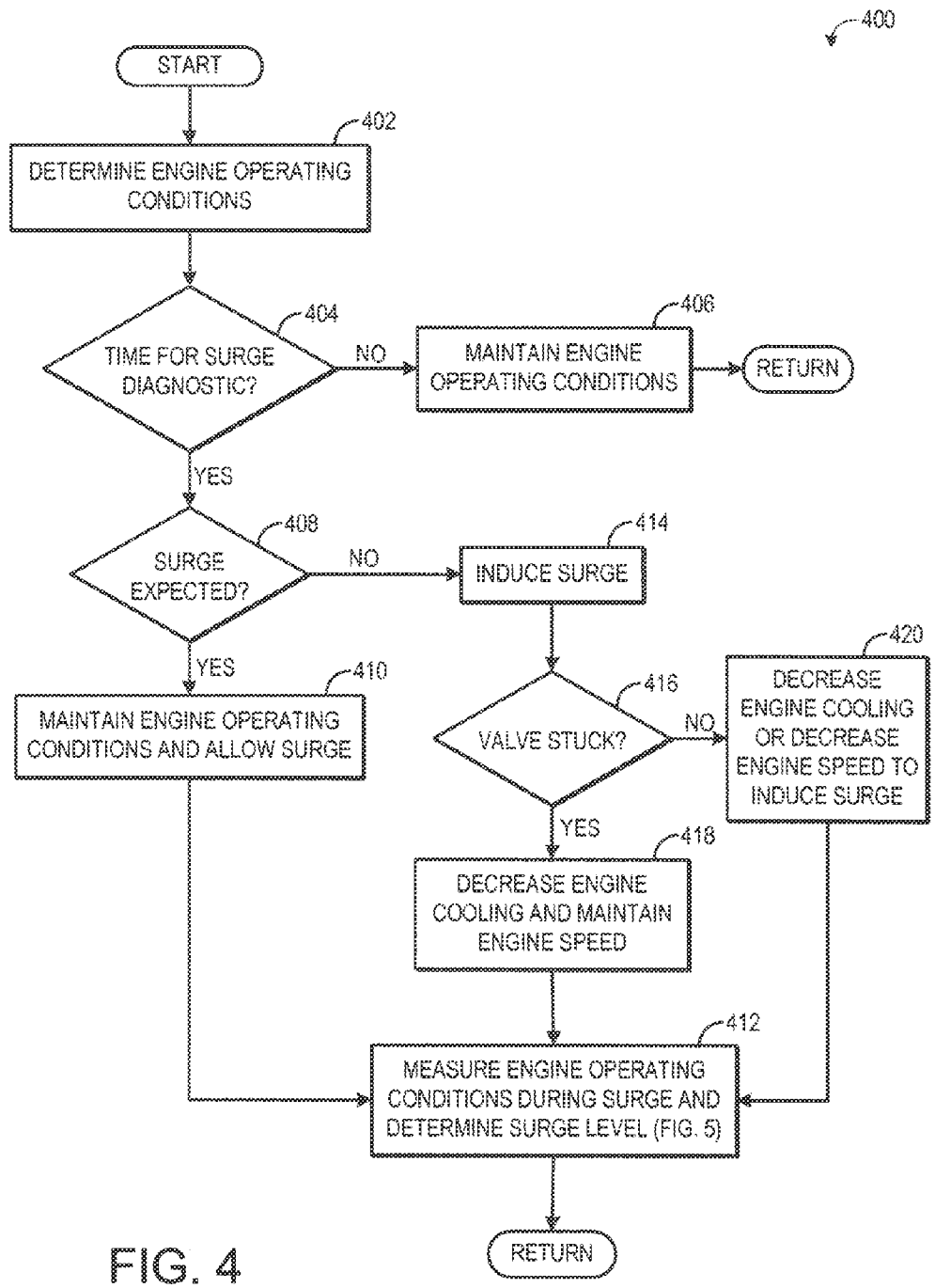
FIG. 4 shows a flow chart illustrating a method for inducing a surge event according to an embodiment of the invention.

FIG. 4 shows a method 400 for inducing or allowing a surge event when it is time for a surge diagnostic. The method begins at 402 by determining engine operating conditions. Engine operating conditions may include engine speed and load, compressor pressure ratio, turbine speed, mass air flow, ambient temperature, intake manifold temperature, MAP, EGR valve positions, or the like.

At 404, the method includes determining if it is time for a surge diagnostic. For example, if the vehicle has been in service for a duration since the last surge diagnostic, a surge diagnostic event may be needed. As such, the controller may be programmed to run a surge diagnostic after the duration has passed. In another example, if an accidental surge event occurs (e.g., was not predicted and avoided by the controller), the controller may trigger a diagnostic surge event to update the surge line. If the method determines it is not time for a surge diagnostic at 404, the controller maintains engine operating conditions at 406. However, if it is time for a surge diagnostic, the method continues on from 404 to 408. At 408, the method includes determining if a surge event is expected or predicted. As discussed above in FIG. 3, this may include determining if an ambient temperature is below a threshold temperature, if the difference between the intake manifold temperature and the intake air temperature is greater than a threshold difference, or if the vehicle is exiting a tunnel. If conditions for a surge event are present and a surge is expected, the controller maintains engine operating conditions at 410 and allows the compressor to surge. At 412, the controller measures engine operating conditions during the surge and then uses this information to determine the measured surge level. This may include measuring the compressor pressure ratio, mass air flow, and turbine speed during the surge event. Further details on the method at 412 are presented at FIG. 5.

Returning to 408, if a surge event is not expected, the method continues on to 414 to induce a surge event. How to induce a surge event may depend on engine operating conditions, including whether or not an EGR valve is stuck in a fixed position. Thus, at 416, the method determines if one or more EGR valves are stuck. This may include gathering data from a position sensor on each valve or assessing whether or not a valve moved during its last commanded actuation. If a valve is stuck, the controller induces surge by decreasing engine cooling while maintaining engine speed at 418. As such, the engine speed may remain relatively high in order to maintain pressure on the valve. The method then continues on to 412 to measure engine operating conditions during the surge event and determine the surge level, as described in further detail at FIG. 5.

Returning to 416, if a valve is not stuck, the controller induces surge by either decreasing cooling or decreasing engine speed at a constant engine load at 420. The choice on how to induce surge may be based on additional engine operating conditions. For example, if engine speed cannot be further decreased, surge may be induced by decreasing engine cooling. In another example, if engine cooling cannot be decreased without affecting combustion, surge may be induced by decreasing engine speed. After inducing surge at 420, the method continues on to 412 to measure engine operating conditions during the surge event and determine the surge level, as described in further detail at FIG. 5.

In this way, during a first condition when an EGR valve is determined as not degraded, a compressor surge event may be induced by one of decreasing engine speed while maintaining a constant engine load and decreasing engine cooling. During a second condition, when an EGR valve is determined as being degraded, a compressor surge event may be induced by decreasing engine cooling while maintaining engine speed. Further, in response to compressor operation approaching a surge level, engine operating conditions may be maintained while enabling operation with the compressor surge.

Figure 5:
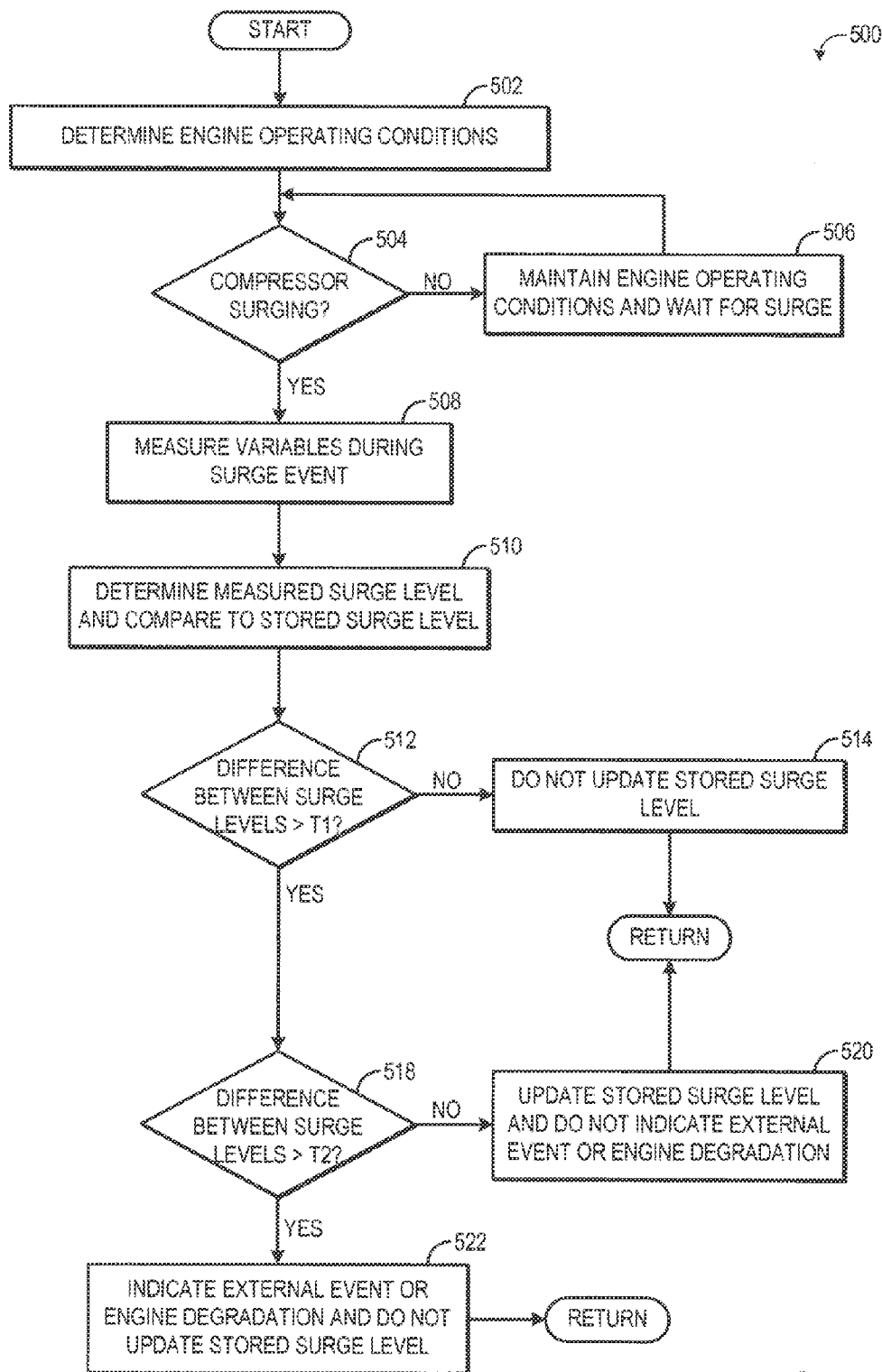
FIG. 5 shows a flow chart illustrating a method for determining a surge level and updating a stored surge level with the determined surge level according to an embodiment of the invention.

FIG. 5 presents a method 500 for determining a surge level during a compressor surge and updating a stored surge level with the determined surge level. The method begins at 502 by determining engine operating conditions. Engine operating conditions may include engine speed and load, compressor pressure ratio, turbine speed, mass air flow, ambient temperature, intake manifold temperature, MAP, EGR valve positions, or the like. At 504, the method includes determining if the compressor is surging. In one example, compressor surge is detected by a sudden decrease in MAP followed by a recovery in MAP. If the compressor is not surging at 504, the controller maintains engine operating conditions at 506 and waits for the compressor to surge. The method at 506 may also include further decreasing engine speed or engine cooling to enable surging.

Returning to 504, if the compressor is surging, the controller measures surge variables during the surge event at 508. Surge variables may include the pressure difference across the compressor, mass air flow, and turbine speed. Using the surge data, the controller determines the measured surge level at 510 and then compares it to a stored surge level. The stored surge level may be a previously measured surge level or a modeled, pre-defined surge level. At 512, the controller determines if the difference between the measured surge level and the stored surge level is greater than a first threshold difference T1. The first threshold difference T1 may be a difference between the modeled and stored surge levels above which the difference cannot be accounted for by normal variation in turbocharger performance. As such, a difference in surge levels greater than the first threshold difference may be indicative of a change in turbocharger operation. If the difference between the modeled and stored surge level is not greater than the first threshold difference, the controller does not update the stored surge level at 514. However, if the difference between the surge levels is greater than the first threshold difference at 512, the method continues on to 518.

At 518, the controller determines if the difference between the measured surge level and the stored surge level is greater than a second threshold difference T2. The second threshold difference T2 may be larger than the first threshold difference T1 and may be indicative of a large change in turbocharger performance and surge levels due to degradation of the engine or vehicle. In one example, an external event such as opening or closing a ventilation door on the vehicle may change the pressure difference across the engine, thereby moving the surge line. As such, a difference between the measured and stored surge level greater than the second threshold difference T2 may indicate the ventilation door is in a different position. In another example, engine degradation such as a leak in an air-handling system of the vehicle, after the compressor, may alter the surge line. In yet another example, engine degradation such as excessive plugging or fouling of the air-handling system after the compressor may alter the surge line. If the difference between the measured surge level and the stored surge level is not greater than the second threshold difference T2, the controller does not indicate an external event or engine degradation and updates the stored surge level with the measured surge level at 520. However, if the difference is greater than the second threshold difference T2, the method continues on to 522 where the controller indicates an external event or engine degradation and does not update the stored surge level. Indicating an external event or engine degradation may include sending a warning or indication to the vehicle operator for vehicle maintenance. The stored surge level is not updated at 522 since the change in the surge level is due to an external event or degradation of the engine rather than a change in turbocharger performance.

In some embodiments, the measured surge level may update the stored surge level even if the difference between the two levels is less than the first threshold difference T1.

In this way, a surge level of a compressor may be determined in response to a compressor surge event. The compressor surge event may be induced, occur opportunistically as compressor operation approaches a surge level, or occur accidentally before surge avoidance can be implemented by the controller. Monitoring surge events may occur continuously. As such, the controller may measure one or more compressor surge events over time. For example, a measured surge level may be determined based on one or more compressor surge events over time. When a difference between the measured surge level and the modeled surge level is greater than a threshold difference, the controller may indicate an external event and update the modeled surge level with the measured surge level. An engine operating parameter may then be adjusted based on the measured surge level. This adjustment may serve to reduce future predicted surge events.

Figure 6:
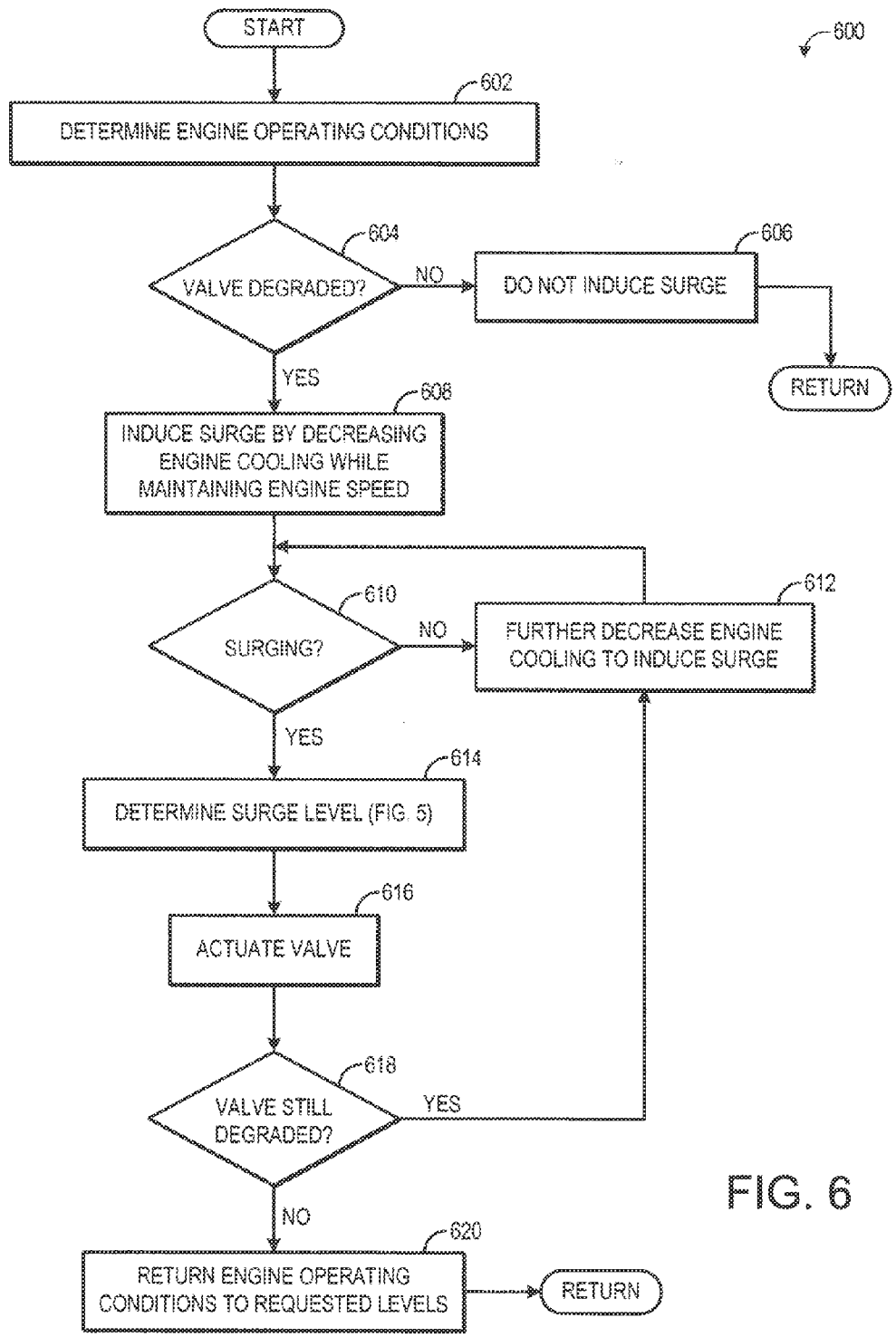
FIG. 6 shows a flow chart illustrating a method for inducing a compressor surge event in response to degradation of an exhaust gas recirculation valve according to an embodiment of the invention.

FIG. 6 presents a method 600 for inducing a compressor surge event in response to degradation of an EGR valve. The method begins at 602 by determining engine operating conditions. Engine operating conditions may include engine speed and load, EGR valve positions, EGR flow rate, mass air flow, compressor pressure ratio, turbine speed, MAP, ambient temperature, or the like. At 604, the method includes determining if one or more of the EGR valves are degraded. Valve degradation may include when the valve is stuck and unable to move when actuated. If a valve is not degraded, surge is not induced at 606 and engine operating conditions are maintained. However, if a valve is degraded, the controller induces surge by decreasing engine cooling while maintaining engine speed at 608.

At 610, the method includes determining if the compressor is surging. If the compressor is not surging, the controller further decreases engine cooling at 612 and returns to 610. The method at 612 may include decreasing cooling and then waiting a duration before re-checking if the compressor is surging. Alternatively at 612, engine operating conditions may be maintained rather than further decreasing engine cooling. This may include waiting a duration to allow the compressor to surge and then re-checking if the compressor is surging. Once the controller has confirmed the compressor is surging at 610, the method continues on to 614 determine the measured surge level, as presented at FIG. 5. The controller then actuates the degraded valve at 616 to determine if the valve is still stuck. If the valve is still degraded at 618, the method returns to 612 to further decrease cooling and induce surge again. Alternatively, if the valve is still degraded at 618, the controller may send an indication of valve degradation to the vehicle operator. The indication may be a request for maintenance of the valve. However, if the valve is no longer degraded at 618, the controller returns engine operating conditions to their requested levels at 620. Thus, compressor surge may be induced in response to degradation of an EGR valve in order to reduce valve degradation.

In this way, a surge level of a compressor may be determined during a surge event and used to update a stored surge level. The compressor surge event may occur accidentally or opportunistically by maintaining engine operating conditions as compressor operation approaches a surge level. Alternatively, the compressor surge event may be induced when a surge diagnostic is needed. By updating a stored surge level with a measured surge level, more accurate surge data may be used to reduce the occurrence of future surge events. Additionally, large changes in the surge level may indicate a change in turbocharger performance due to degradation or another external event. As such, turbocharger efficiency may be maintained while reducing degradation to the engine.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    updating a stored estimate of a surge level of a compressor in an engine system of a vehicle responsive to detection of a surge event; and
    inducing the surge event by adjusting a first operating parameter during a first condition, and inducing the surge event by adjusting a second operating parameter during a second condition.

2. The method of claim 1, wherein updating the stored estimate of the surge level includes determining a measured surge level by measuring two or more of a pressure difference across the compressor, an engine speed, a turbine speed, and a mass air flow rate during the surge event.

3. The method of claim 2, further comprising updating a modeled surge level based on the measured surge level if a difference between the measured surge level and the modeled surge level is greater than a threshold difference.

4. The method of claim 1, wherein adjusting the first operating parameter during the first condition includes decreasing engine speed responsive to a determination that an exhaust gas recirculation valve is not degraded, and wherein adjusting the second operating parameter during the second condition includes decreasing engine cooling responsive to a determination that the exhaust gas recirculation valve is degraded.

5. The method of claim 4, wherein decreasing the engine speed includes decreasing the engine speed while maintaining tractive power of the vehicle.

6. The method of claim 1, further comprising in response to compressor operation approaching the surge level, maintaining engine operating conditions and enabling operation with compressor surge.

7. A method, comprising:
    updating a stored estimate of a surge level of a compressor in an engine system of a vehicle responsive to detection of a surge event; and
    inducing the surge event in response to degradation of an exhaust gas recirculation valve.

8. The method of claim 1, further comprising controlling the engine system of the vehicle, for at least vehicle propulsion, based on the stored estimate of the surge level that is updated.

9. A method, comprising:
    determining a surge level of a compressor in an engine system of a vehicle in response to a compressor surge event;
    updating a stored surge level with the determined surge level; and
    inducing the compressor surge event after a designated duration of service of the vehicle.

10. The method of claim 9, wherein determining the surge level includes measuring two or more of a pressure difference across the compressor, an engine speed, a turbine speed, and a mass air flow rate during the compressor surge event.

11. The method of claim 9, further comprising adjusting an engine operating parameter based on the determined surge level.

12. The method of claim 9, further comprising indicating degradation of the engine system when a difference between the determined surge level and the stored surge level is greater than a threshold difference.

13. The method of claim 9, wherein inducing the compressor surge event includes at least one of decreasing engine speed while maintaining a constant engine load or decreasing engine cooling when an exhaust gas recirculation valve in the engine system is determined as not degraded.

14. The method of claim 9, wherein inducing the compressor surge event includes decreasing engine cooling while maintaining engine speed when an exhaust gas recirculation valve in the engine system is determined as being degraded.

15. A method, comprising:
    determining a surge level of a compressor in an engine system of a vehicle in response to a compressor surge event;
    updating a stored surge level with the determined surge level; and
    inducing the compressor surge event by decreasing engine cooling and maintaining engine speed in response to degradation of an exhaust gas recirculation valve.

16. A method, comprising:
    determining a measured surge level based on one or more compressor surge events of an engine system over time;

when a difference between a measured surge level and a modeled surge level is greater than a threshold difference, indicating an external event and updating the modeled surge level with the measured surge level; and inducing the one or more compressor surge events by decreasing engine speed when an exhaust gas recirculation valve is determined as not degraded and inducing the one or more compressor surge events by decreasing engine cooling when the exhaust gas recirculation valve is determined as degraded.

17. The method of claim 16, further comprising adjusting an engine operating parameter based on the measured surge level.

18. The method of claim 16, wherein the external event includes degradation of a vehicle in which the engine system is positioned.

19. A method, comprising:

inducing a compressor surge event by decreasing engine cooling while maintaining engine speed in response to determining degradation of an exhaust gas recirculation valve in an engine system.

\* \* \* \* \*